US009186744B2

(12) United States Patent
Hirota et al.

(10) Patent No.: US 9,186,744 B2
(45) Date of Patent: Nov. 17, 2015

(54) WELDING DEVICE

(71) Applicant: Panasonic Intellectual Property Management Co., Ltd., Osaka (JP)

(72) Inventors: Yukinori Hirota, Hyogo (JP); Atsuhiro Kawamoto, Hyogo (JP); Kaito Matsui, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/679,783

(22) Filed: Apr. 6, 2015

(65) Prior Publication Data

US 2015/0209888 A1 Jul. 30, 2015

Related U.S. Application Data

(63) Continuation of application No. 13/583,647, filed as application No. PCT/JP2011/004973 on Sep. 6, 2011, now Pat. No. 9,029,732.

(30) Foreign Application Priority Data

Sep. 17, 2010 (JP) ................................ 2010-208908

(51) Int. Cl.
*B23K 9/095* (2006.01)
*B23K 9/10* (2006.01)
*B23K 9/12* (2006.01)

(52) U.S. Cl.
CPC ............ *B23K 9/1062* (2013.01); *B23K 9/0953* (2013.01); *B23K 9/124* (2013.01)

(58) Field of Classification Search
CPC ................................ B23K 9/093; B23K 9/095
USPC ........ 219/121.14, 130.1, 130.01, 132, 130.33
See application file for complete search history.

(56) References Cited

U.S. PATENT DOCUMENTS 6,096,994 A * 8/2000 Handa et al. ............... 219/130.5

FOREIGN PATENT DOCUMENTS

| | | |
|---|---|---|
| JP | 01-122664 | 5/1989 |
| JP | 02-270001 | 11/1990 |
| JP | 06-126453 | 5/1994 |
| JP | 05-057436 | 3/1999 |
| JP | D1274142 | 6/2006 |
| WO | 97/10919 | 3/1997 |

OTHER PUBLICATIONS

International Search Report of PCT Application No. PCT/JP2011/004973 dated Nov. 15, 2011.

* cited by examiner

*Primary Examiner* — Brian Jennison
(74) *Attorney, Agent, or Firm* — Panasonic Patent Center

(57) ABSTRACT

A method to determine welding conditions includes relational expressions or tables about various parameters for setting welding conditions. The method can determine and display the recommended values for the welding conditions which are suitable for the information about the object to be welded and the information about the welding method set by the operator. The welding conditions include a welding current, a welding voltage, a wire feed speed, a welding speed, and a leg length. Furthermore, if the operator changes the recommended value for a welding condition to a new value, the method can determine new recommended values for the other welding conditions compatible with the new value and display the new recommended values.

19 Claims, 15 Drawing Sheets

WELDING DEVICE

TECHNICAL FIELD

The present invention relates to a method to determine welding conditions suitable for an object to be welded (base material) in consumable electrode arc welding in which an arc is created between an electrode wire and the object. The invention also relates to a welding device which can determine the welding conditions.

BACKGROUND ART

In conventional arc welding, welding operators set welding conditions such as welding current, welding voltage, and welding speed to the welding device according to their knowledge and experience. Then, the operators repeatedly change welding conditions while verifying the welding results, and finally find the optimum welding conditions.

There are well-known welding machines including an encoder which is generally called a jog dial, and a light emitting diode (LED) display device with which allow operators to set welding conditions (see, for example, Patent Literature 1).

Expert operators may set welding conditions in a comparatively short time according to their knowledge and experience. Inexperienced operators who are growing in number these days, however, often spend a lot of time and waste a lot of objects before setting optimum welding conditions.

CITATION LIST

Patent Literature

Patent Literature 1: Design registration No. 1274142

SUMMARY OF THE INVENTION

An object of the present invention is to provide a method for determining welding conditions and a welding device which can easily calculate welding conditions.

To solve the above-described problems, a method of the present invention to determine welding conditions includes the following steps: a first step of receiving object-to-be-welded information, which is information about an object to be welded; a second step of receiving welding method information, which is information about an arc welding method; a third step of determining a quantity of arc heat, which is a quantity of heat of an arc created between an electrode wire and an object to be welded based on the object-to-be-welded information and the welding method information; a fourth step of determining a recommended value for a wire feed speed, a recommended value for a leg length, a recommended value for a welding speed, a recommended value for a welding current, and a recommended value for a welding voltage based on the object-to-be-welded information, the welding method information, and the quantity of arc heat; a feed speed calculation step of, if at least one of the leg length and the welding speed which are displayed as welding conditions after the fourth step is changed to a value different from the recommended values determined in the fourth step, calculating the wire feed speed from the after-change value, based on a formula for calculating the wire feed speed, which is in proportion to a square of the leg length and also in proportion to the welding speed; a current value calculation step of calculating the welding current from the wire feed speed calculated in the feed speed calculation step based either on a formula for calculating the welding current, which increases with an increase in the wire feed speed or on a table showing a relation between the wire feed speed and the welding current; and a voltage value calculation step of calculating the welding voltage from the welding current calculated in the current value calculation step. The welding current calculated in the current value calculation step and the welding voltage calculated in the voltage value calculation step are determined to be a new recommended value for the welding current and a new recommended value for the welding voltage, respectively.

This method can determine and display the recommended values for the welding conditions which are suitable for the information about the object to be welded and the information about the welding method set by the operator. The welding conditions include a welding current, a welding voltage, a wire feed speed, a welding speed, and a leg length. Furthermore, if the operator changes the recommended value for a welding condition to a new value, the method can determine new recommended values for the other welding conditions compatible with the new value and display the new recommended values.

This reduces the operator's time and effort to determine the welding conditions, thereby reducing the operator's burden to set welding conditions. This also reduces the amount of objects wasted until the definitive welding conditions are determined.

Another method of the present invention to determine welding conditions includes the following steps: a first step of receiving object-to-be-welded information, which is information about an object to be welded; a second step of receiving welding method information, which is information about an arc welding method; a third step of determining a quantity of arc heat, which is a quantity of heat of an arc created between an electrode wire and an object to be welded based on the object-to-be-welded information and the welding method information; a fourth step of determining a recommended value for a wire feed speed, a recommended value for a leg length, a recommended value for a welding speed, a recommended value for a welding current, and a recommended value for a welding voltage based on the object-to-be-welded information, the welding method information, and the quantity of arc heat; a current value/voltage value calculation step of calculating the welding current and the welding voltage from an integrated value based on a relational expression or table showing a relation between the welding current and the welding voltage if the welding speed displayed as a welding condition after the fourth step is changed to a value different from the recommended value for the welding speed, the integrated value being calculated from the already-determined quantity of arc heat and the displayed after-change value of the welding speed based on a formula for calculating the quantity of arc heat, which is in proportion to the welding current and the welding voltage and is in inverse proportion to the welding speed. When the displayed welding speed is changed, the welding current and the welding voltage calculated in the current value/voltage value calculation step are determined to be a new recommended value for welding current and a new recommended value for the welding voltage, respectively.

This method can determine and display the recommended values for the welding conditions which are suitable for the information about the object to be welded and the information about the welding method set by the operator. The welding conditions include a welding current, a welding voltage, a wire feed speed, a welding speed, and a leg length. Furthermore, if the operator changes the recommended value for a welding condition to a new value, the method can determine new recommended values for the other welding conditions compatible with the new value and display the new recommended values.

This reduces the operator's time and effort to determine the welding conditions, thereby reducing the operator's burden to set welding conditions. This also reduces the amount of objects wasted until the definitive welding conditions are determined.

DESCRIPTION OF EMBODIMENTS

First Exemplary Embodiment

Figure 1:
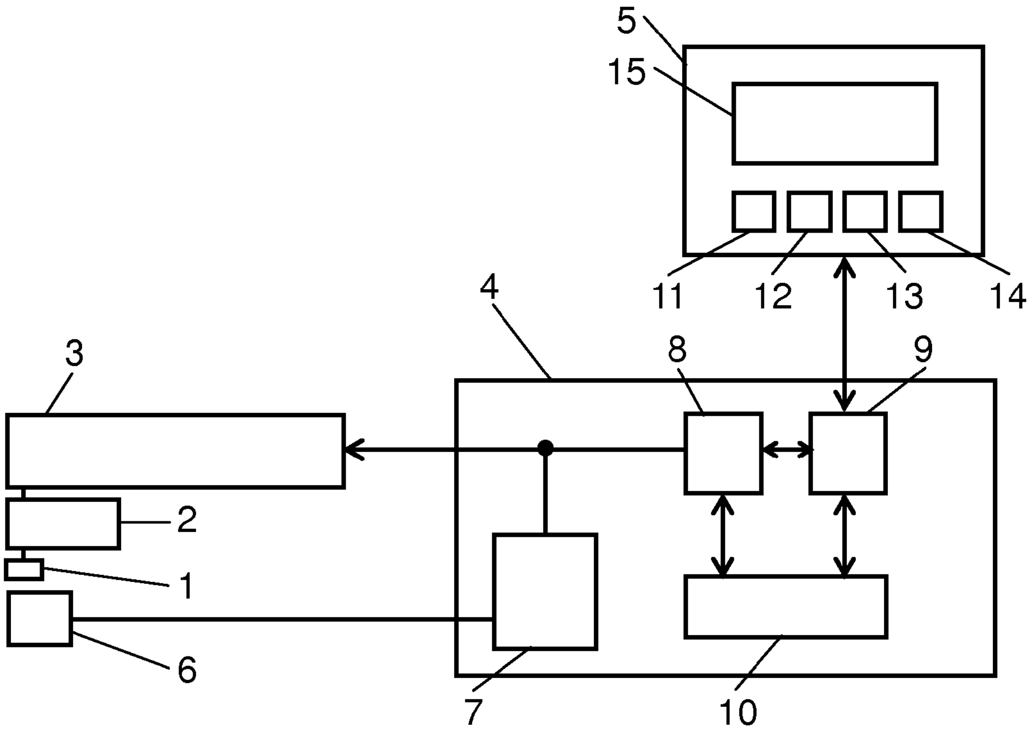
FIG. 1 shows a schematic configuration of a welding device according to a first exemplary embodiment of the present invention.

FIG. 1 shows a schematic configuration of a welding device according to a first exemplary embodiment of the present invention.

As shown in FIG. 1, the welding device of the present first exemplary embodiment, which is an arc welding device, includes manipulator 3, robot controller 4 for controlling the operation of manipulator 3, and setting device 5. Manipulator 3 moves welding torch 2, which holds electrode wire 1. Setting device 5 performs communications with robot controller 4 so as to set information to robot controller 4.

Robot controller 4 includes welding power supply 7, control unit 8, calculation unit 9, and storage unit 10. Welding power supply 7 supplies electric power to wire 1 so that welding is applied to object 6 to be welded. Control unit 8 controls the operations of manipulator 3 and welding power supply 7. Calculation unit 9 performs calculations for welding conditions. Storage unit 10 stores an operational program with which control unit 8 controls the operation of manipulator 3, mathematical formulas and tables that calculation unit 9 uses for calculation, and calculation results. Welding power supply 7, which is disposed in robot controller 4 as shown in FIG. 1, may alternatively be disposed outside robot controller 4.

As will be described later, setting device 5 includes object-to-be-welded information input unit 11 and welding method information input unit 12. Object-to-be-welded information input unit 11 receives information about object 6. Welding method information input unit 12 receives information about the welding method. Setting device 5 further includes leg length setting unit 13, welding speed setting unit 14, and display unit 15. Leg length setting unit 13 sets or changes the leg length when object 6 is welded. Welding speed setting unit 14 sets or changes the welding speed. Display unit 15 displays various information items.

The following is a description of a method to determine welding conditions according to the present first exemplary embodiment.

Figure 2:
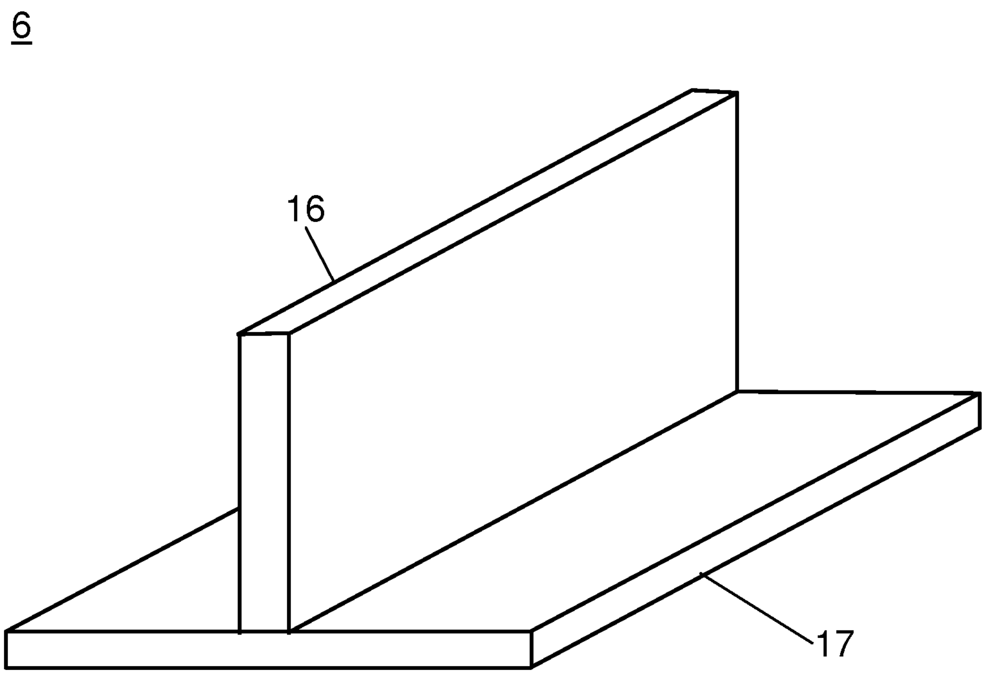
FIG. 2 shows an example of an object to be welded in the first exemplary embodiment.
Figure 3:
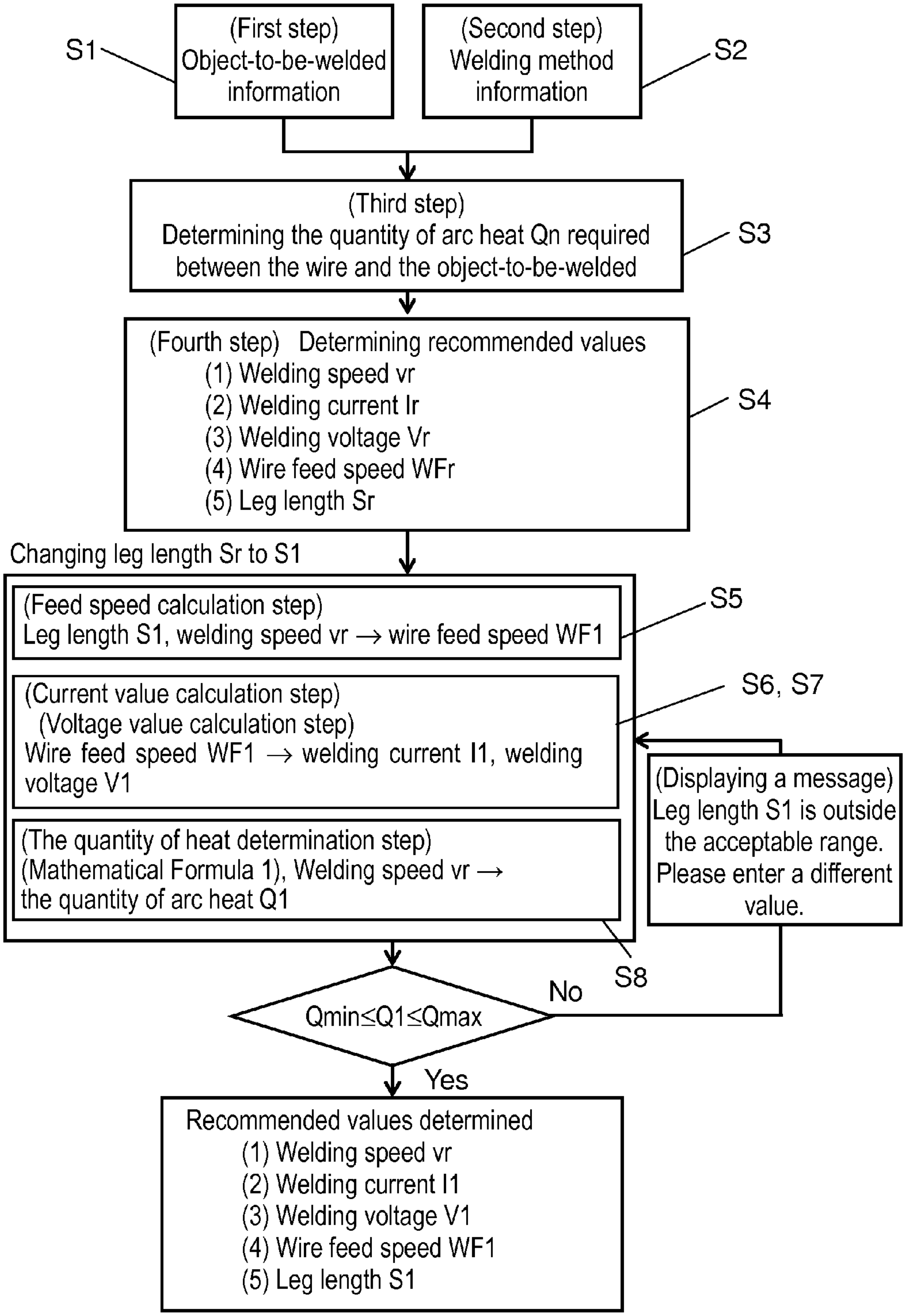
FIG. 3 is a flowchart showing a procedure to determine recommended values for welding conditions in the first exemplary embodiment.

FIG. 2 shows an example of object 6 to be welded in the first exemplary embodiment. FIG. 3 is a flowchart showing a procedure to determine recommended values for the welding conditions in the first exemplary embodiment.

As shown in FIG. 2, a T joint consisting of upper board 16 and lower board 17 is going to be welded.

The present first exemplary embodiment first describes a method to determine recommended values for a welding speed v, a welding current I, a welding voltage V, a wire feed speed WF, and a leg length S in response to the object-to-be-welded information and welding method information which are entered by the operator through setting device 5 to the welding device. These recommended values are displayed on display unit 15 of setting device 5 so as to be provided as welding condition information to the operator. The present first exemplary embodiment next describes a method to determine new recommended values for the welding speed v, the welding current I, the welding voltage V, and the wire feed speed WF when the operator changes the displayed recommended value for the leg length to a new value. The new recommended values are displayed on display unit 15 so as to be provided as the welding conditions to the operator.

The following is a description of the method to determine the recommended values for the welding current and the other welding conditions when the operator enters the object-to-be-welded information and the welding method information to the welding device.

In a first step S1 in FIG. 3, the operator enters object-to-be-welded information about object 6 to the welding device through object-to-be-welded information input unit 11 of setting device 5. The object-to-be-welded information set in the first step S1 includes the materials and thicknesses of upper and lower boards 16 and 17, and the joint shape of object 6.

In a second step S2 in FIG. 3, the operator enters welding method information, which is the information about the arc welding method, to the welding device through welding method information input unit 12 of setting device 5. The welding information entered in the second step S2 includes the following items: the use or non-use of pulse welding, indicating whether or not pulse welding is used in the arc welding, the pulse mode type, the shielding gas type, the extended length of the welding wire, the method for controlling the wire feed, the material of wire 1, and the diameter of wire 1.

The following is a description of determining a recommended value vr for the welding speed, a recommended value WFr for the wire feed speed, a recommended value Ir for the welding current, a recommended value Vr for the welding voltage, and a recommended value Sr for the leg length.

The recommended value vr for the welding speed is calculated as follows.

A plurality of pieces of information about the welding speed v, which are associated with the object-to-be-welded information and the welding method information are previously stored in the form of calculation formulas or tables in storage unit 10.

Calculation unit 9 selects one piece of information about the welding speed v as the recommended value vr for the welding speed from storage unit 10 based on the object-to-be-welded information and the welding method information which are entered by the operator through setting device 5.

The recommended value WFr for the wire feed speed is calculated as follows.

Figure 4:
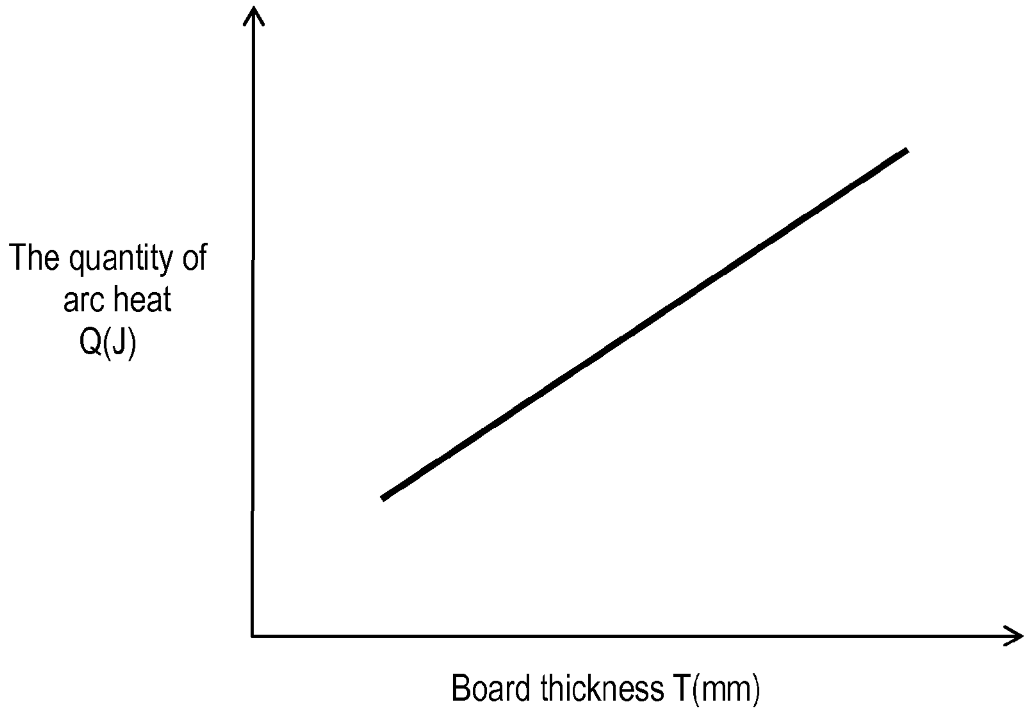
FIG. 4 shows the relation between board thickness and the quantity of arc heat required for welding in the first exemplary embodiment.

FIG. 4 shows the relation between board thickness and the quantity of arc heat required for welding in the first exemplary embodiment.

Storage unit 10 previously stores a plurality of properties shown in FIG. 4, which are associated with the object-to-be-welded information and the welding method information. FIG. 4 shows the relation between a board thickness T and a quantity of arc heat Q to achieve satisfactory welding. The board thickness T is the average value of a board thickness T1 of upper board 16 and a board thickness T2 of lower board 17. The quantity of arc heat Q indicates the quantity of heat of an arc created between wire 1 and object 6. The board thickness T belongs to the object-to-be-welded information, and the quantity of arc heat Q belongs to the welding method information. The meaning of "satisfactory welding" includes sufficient strength, non-defective weld bead, and no burn-through.

Calculation unit 9 selects one property shown in FIG. 4 from storage unit 10 based on the object-to-be-welded information and the welding method information entered by the operator through setting device 5. Calculation unit 9 further calculates the board thickness T, which is the average value of board thicknesses T1 and T2 of upper and lower boards 16 and 17, respectively, entered by the operator through setting device 5. Calculation unit 9 further calculates a quantity of arc heat Qn required between wire 1 and object 6 from the selected property and the board thickness T shown in FIG. 4. This process is performed in a third step S3 shown in FIG. 3.

The wire feed speed WF increases with an increase in the quantity of arc heat Q. Therefore, the relation between the quantity of arc heat Q and the wire feed speed WF is uniquely determined based on the welding method information. A plurality of pieces of information about the relation (mathematical formulas or tables) between the quantity of arc heat Q and the wire feed speed WF, which are associated with the welding method information are previously stored in storage unit 10.

Calculation unit 9 calculates the wire feed speed WF from the welding method information entered in the second step S2, the information about the relation between the quantity of arc heat Q and the wire feed speed WF stored in storage unit 10, and the above-determined quantity of arc heat Qn. The wire feed speed WF is determined to be the recommended value WFr.

The recommended value for the welding current I is calculated as follows.

The welding current I increases with an increase in the wire feed speed WF. Therefore, the relation between the wire feed speed WF and the welding current I is uniquely determined based on the welding method information. A plurality of pieces of information (mathematical formulas or tables) about the relation between the wire feed speed WF and the welding current I, which are associated with the welding method information are previously stored in storage unit 10.

Calculation unit 9 calculates the welding current I from the information about the relation between the wire feed speed WF and the welding current I stored in storage unit 10, the welding method information entered in the second step S2, and the above-calculated recommended value WFr for the wire feed speed. The calculated welding current I is determined to be the recommended value Ir.

The recommended value Vr for the welding voltage V is calculated as follows.

The quantity of arc heat Q, the welding current I, the welding voltage V, and the welding speed v are in the relation shown in Mathematical Formula 1, which is stored in storage unit 10.

$$Q=(I\times V\times 60)/v \quad \text{Mathematical Formula 1}$$

Calculation unit 9 then calculates the product of the welding current I×the welding voltage V from Mathematical Formula 1 stored in storage unit 10, the above-calculated recommended value vr for the welding speed, and the above-determined quantity of arc heat Qn.

Calculation unit 9 further calculates the welding voltage V from the product of the welding current I×the welding voltage V, and the above-calculated recommended value Ir for the welding current. The welding voltage V is determined to be the recommended value Vr.

The recommended value Sr for the leg length S is calculated as follows.

The leg length S, a wire diameter d, the wire feed speed WF, and the welding speed v are in the relation shown in Mathematical Formula 2, which is stored in storage unit 10.

$$S=d\surd((\pi\times WF)/(2\times v)) \quad \text{Mathematical Formula 2}$$

Calculation unit 9 calculates the leg length S from Mathematical Formula 2 stored in storage unit 10, the wire diameter d entered in the second step S2, the above-calculated recommended value WFr for the wire feed speed, and the above-calculated recommended value vr for the welding speed. The leg length S is determined to be the recommended value Sr.

Display unit 15 of setting device 5 displays the recommended value vr for the welding speed, the recommended value WFr for the wire feed speed, the recommended value Ir for the welding current, the recommended value Vr for the welding voltage, and the recommended value Sr for the leg length, which are calculated as above in calculation unit 9.

Figure 5:
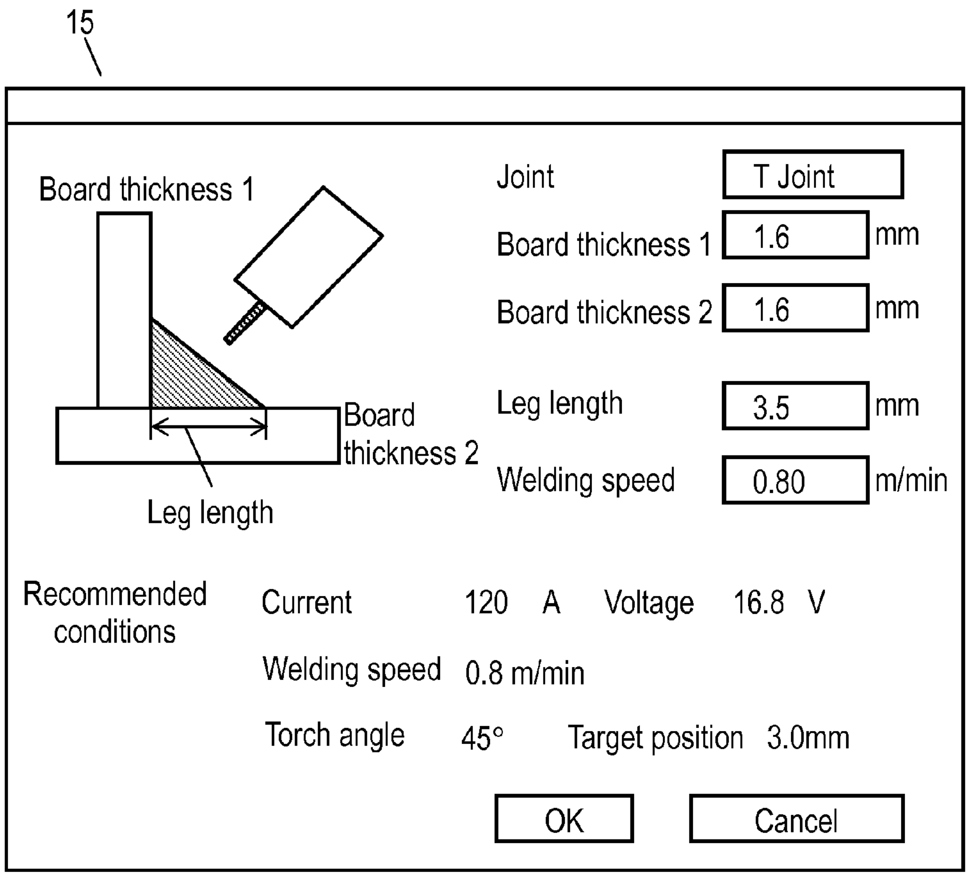
FIG. 5 shows an example of a display screen of a setting device in the first exemplary embodiment.

FIG. 5 shows an example of a display screen of the setting device in the first exemplary embodiment.

FIG. 5 shows an example of a display screen on display unit 15 of setting device 5. The example in FIG. 5 shows the following object-to-be-welded information: T joint; the board thickness of the upper board: 1.6 mm; and the lower board: 1.6 mm. The example further shows the following recommended values: the welding speed v: 0.8 m/min; the welding current I: 120 A; the welding voltage V: 16.8V; and the leg length S: 3.5 mm.

Note that FIG. 5 does not show the recommended value WFr for the wire feed speed. The reason is that the welding current I and the wire feed speed WF are in proportion to each other, and that it is more common to set the welding current I than the wire feed speed WFr as a welding condition.

Thus, the recommended values for the welding current I and the other conditions can be determined based on the object-to-be-welded information and the welding method information. This process is performed in a fourth step S4 shown in FIG. 3.

The following is a description of a method to determine and displaying new recommended values for the welding speed v, the welding current I, the welding voltage V, and the wire feed speed WF when the operator changes the displayed recommended value Sr for the leg length to a new value.

The leg length S is an element to dominate the welded joint strength, and hence may be specified in the drawing for welding. Therefore, setting device 5 of the welding device according to the present first exemplary embodiment includes leg length setting unit 13, which allows the operator to change the value of the leg length S by entering an arbitrary value.

The following is a description of a method to determine new recommended values for the welding current I and the other welding conditions assuming that the operator has changed the value of the leg length S from the recommended value Sr to a leg length S1 through leg length setting unit 13 of setting device 5 when the recommended value Sr is displayed on display unit 15 of setting device 5.

A new recommended value for the welding speed v is calculated as follows.

As described above, calculation unit 9 selects one piece of information about welding speed v as the recommended value vr from storage unit 10 based on the object-to-be-welded information and the welding method information which are entered by the operator through setting device 5. Even when the recommended value Sr is changed to the leg length S1, the recommended value vr for the welding speed remains the same because the object-to-be-welded information and the welding method information remain the same.

A new recommended value for the wire feed speed WF is calculated as follows.

Calculation unit 9 derives a formula for calculating the wire feed speed (Mathematical Formula 3) from Mathematical Formula 2 for calculating the leg length S stored in storage unit 10.

$$WF=(2\times S^2\times v)/(\pi\times d^2) \qquad \text{Mathematical Formula 3}$$

Calculation unit 9 calculates a wire feed speed WF1 from Mathematical Formula 3, the after-change value S1 of the leg length, the recommended value vr for the welding speed, and the wire diameter d, which is the diameter of wire 1 entered as the welding method information. The wire feed speed WF1 is a new recommended value for the wire feed speed WF. This process is performed in a feed speed calculation step S5 shown in FIG. 3.

A new recommended value for the welding current I is calculated as follows.

The welding current I increases with an increase in the wire feed speed WF. Therefore, the relation between the wire feed speed WF and the welding current I is uniquely determined based on the welding method information. A plurality of pieces of information (mathematical formulas or tables) about the relation between the wire feed speed WF and the welding current I, which are associated with the welding method information are previously stored in storage unit 10. Calculation unit 9 calculates a welding current I1 from the information about the relation between the wire feed speed WF and the welding current I stored in storage unit 10, the welding method information entered in the second step S2, and the above-calculated new recommended value for the wire feed speed WF. The welding current I1 is determined to be the new recommended value for the welding current I. This process is performed in a current value calculation step S6 shown in FIG. 3.

A new recommended value for the welding voltage V is calculated as follows.

The welding voltage V increases with an increase in the welding current I. Therefore, the relation between the welding current I and the welding voltage V is uniquely determined based on the welding method information. A plurality of pieces of information (mathematical formulas or tables) about the relation between the welding current I and the welding voltage V, which are associated with the welding method information are previously stored in storage unit 10.

Calculation unit 9 calculates a welding voltage V1 from the information about the relation between the welding current I and the welding voltage V stored in storage unit 10, and the above-calculated welding current I1 (new recommended value). The welding voltage V1 is determined to be the new recommended value. This process is performed in a voltage value calculation step S7 shown in FIG. 3.

As described above, when the leg length S is changed from the recommended value Sr to the leg length S1, the welding device can determine the recommended value vr for the welding speed (no changes), and the new recommended value for the welding current I, the new recommended value for the welding voltage V, and the new recommended value of the wire feed speed WF. These values are displayed on display unit 15 of setting device 5 so as to be provided as information to the operator.

Note, however, that the welding device can provide the information about the new recommended values for the welding current I1 and the other conditions to the operator only when the leg length S1 which has replaced the recommended value has an appropriate value. The following is a description of an example to determine whether or not the new recommended values should be displayed on display unit 15, according to the quantity of arc heat Q.

A quantity of arc heat Q1 in the after-change value S1 of the leg length is calculated from Mathematical Formula 1, the new recommended value for the welding voltage V, the new recommended value for the welding current I, and the recommended value vr for the welding speed. The quantity of arc heat Q1, which is the quantity of heat of an arc created between wire 1 and object 6 is not uniquely determined with respect to the object-to-be-welded information set in the first step S1.

Figure 6:
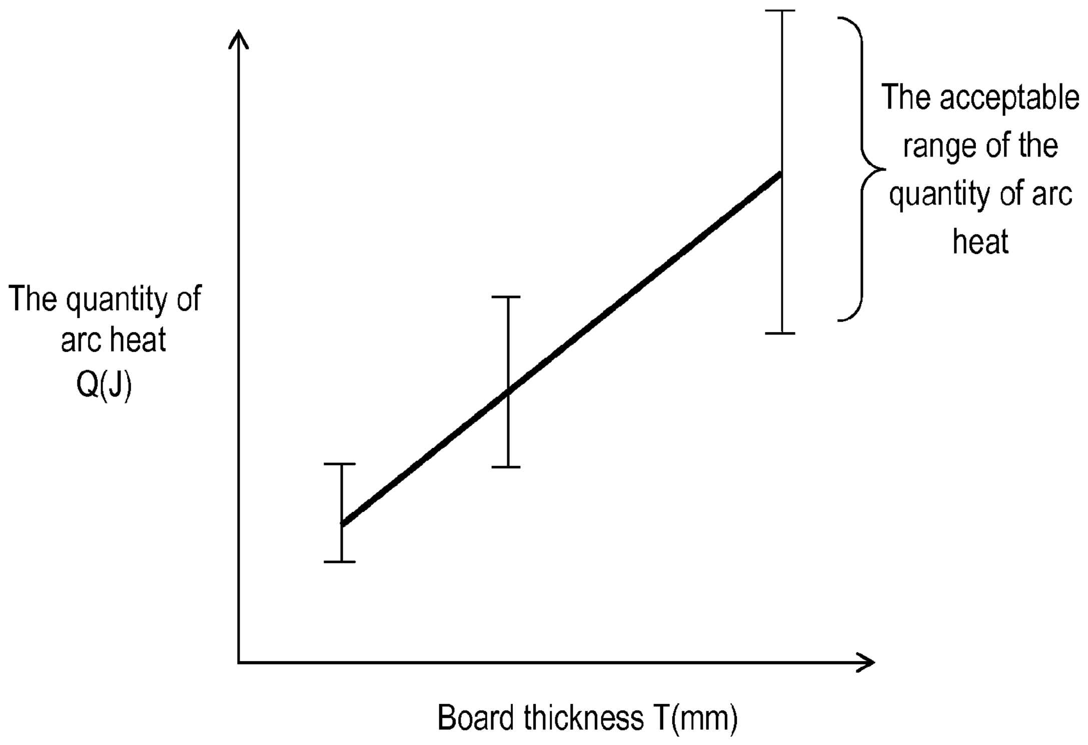
FIG. 6 shows the relation between board thickness and the quantity of arc heat required for welding, and the acceptable range of the quantity of arc heat in the first exemplary embodiment.

FIG. 6 shows the relation between board thickness and the quantity of arc heat required for welding, and the acceptable range of the quantity of arc heat in the first exemplary embodiment.

The inventors of the present invention have experimentally confirmed that, as shown in FIG. 6, in the relation between board thickness and the quantity of arc heat required for welding, the quantity of arc heat required for welding actually has conditional margins with upper and lower limits, and that the conditional margins tend to widen with an increase in the board thickness T.

Therefore, when the operator sets the leg length S1 different from the recommended value, calculation unit 9 can calculate the quantity of arc heat Q1 from the value of the welding current calculated in the current value calculation step S6, the value of the welding voltage calculated in the voltage value calculation step S7, and the recommended value vr for the welding speed. This process is performed in a quantity of heat determination step S8 shown in FIG. 3. If the determined quantity of arc heat Q1 is above the upper limit or below the lower limit of the quantity of arc heat Q predetermined and stored in storage unit 10, the leg length S1 set by the operator is determined to be outside the acceptable range.

Display unit 15 of setting device 5 displays that the leg length S1 set by the operator is outside the acceptable range according to the determination result. Display unit 15 does not display the new recommended values for the welding current I1, the welding voltage V1, and the other conditions calculated as above. This can prevent the operator from setting the new recommended values as the welding conditions. Display unit 15 further displays a message to urge the operator to enter a different leg length S1.

Assume, on the other hand, that the set leg length S1 is within the acceptable range. In this case, display unit 15 displays the calculated values of the welding current I1, the welding voltage V1, and the other welding conditions as the new recommended values. This allows the operator to set the new recommended values as the welding conditions.

As described above, the welding device and the method to determine welding conditions of the present first exemplary embodiment can determine and display the recommended values for welding conditions which are suitable for the information about the object to be welded and the information about the welding method set by the operator. The welding conditions include the welding current I, the welding voltage V, the wire feed speed WF, the welding speed v, and the leg length S. Furthermore, if the operator changes the recommended value for the leg length S to the leg length S1, the welding device and the method to determine welding conditions can determine new recommended values for the other welding conditions compatible with the after-change value S1 of the leg length and display the new recommended values.

Thus, the welding device and the method to determine welding conditions according to the present first exemplary embodiment can minimize the operator's time and effort to determine the welding conditions, and the amount of objects wasted through trial and error.

The welding device performs calculations using the quantity of arc heat Q required for object 6, thereby providing appropriate welding conditions whatever the combination of board thicknesses or whatever the joint shape.

Figure 7:
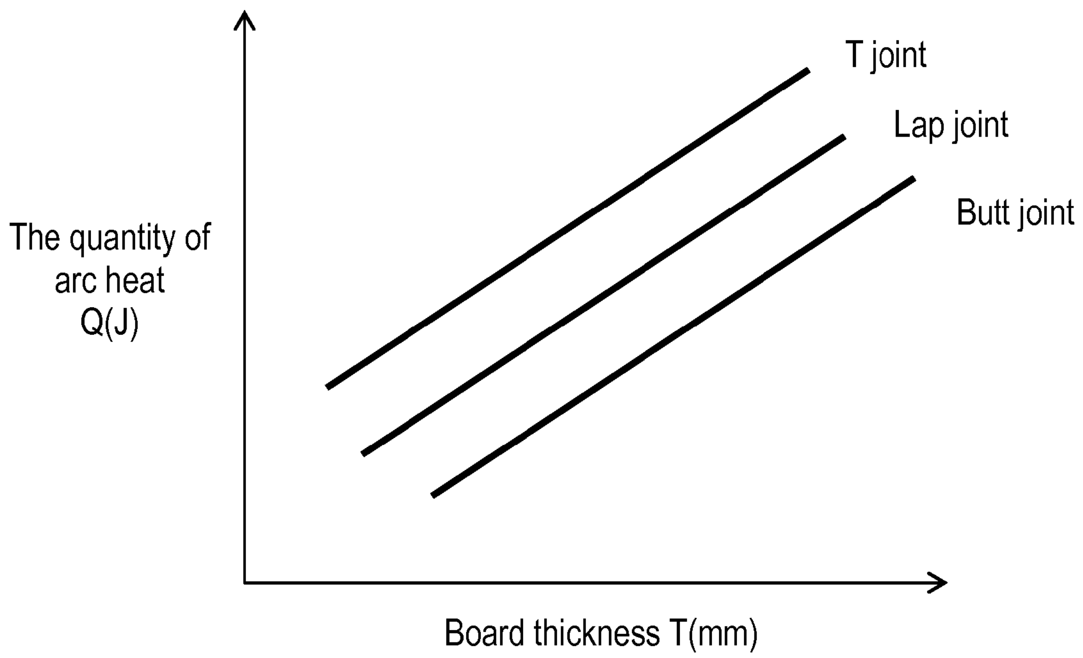
FIG. 7 shows the relation between the board thicknesses of different joints and the quantity of arc heat required for welding in the first exemplary embodiment.

FIG. 7 shows the relation between the board thicknesses of different joints and the quantity of arc heat required for welding in the first exemplary embodiment.

The welding device stores, in storage unit 10, information (calculation formulas or tables) of the properties indicating the relation between the quantity of arc heat Q and the board thickness T for each joint as shown in FIGS. 4 and 7. The quantity of arc heat Q is determined based on the entered object-to-be-welded information. The welding device then calculates the recommended values for the welding conditions using the quantity of arc heat Q. The board thickness T shown in FIGS. 4 and 7 is the average value of the board thicknesses of upper and lower boards 16 and 17. Therefore, whatever the board thicknesses of upper and lower boards 16 and 17, the welding device can calculate T as the average value. The welding device can determine the quantity of arc heat Q based on T, and can calculate the recommended values for the welding conditions using the quantity of arc heat Q. Thus, the welding device can cope with any combination of the board thicknesses.

The welding device allows the operator to change the leg length S from the recommended value to a different value. If the leg length S is set outside the acceptable range, a message indicating the leg length S is outside the acceptable range is displayed, making the welding device extremely user-friendly.

There are different welding target positions and different welding torch angles depending on the object-to-be-welded information set in the first step S1. Therefore, the welding device can also combine the appropriate condition of the average board thickness (T) of upper and lower boards 16 and 17, and the appropriate condition of the difference between their thicknesses included in the object-to-be-welded information set in the first step S1.

As shown in FIG. 5, the welding device displays the torch angle and the target position on display unit 15 of setting device 5, thereby providing them as information to the operator.

Thus, the method to determine welding conditions according to the present invention includes a first step S1, a second step S2, a third step S3, a fourth step S4, a feed speed calculation step S5, a current value calculation step S6, and a voltage value calculation step S7. The first step S1 receives object-to-be-welded information, which is information about an object to be welded. The second step S2 receives welding method information, which is information about an arc welding method. The third step S3 determines the quantity of arc heat Q, which is the quantity of heat of an arc created between an electrode wire and an object to be welded based on the object-to-be-welded information and the welding method information. The fourth step S4 determines the recommended value WFr for the wire feed speed, the recommended value Sr for the leg length, the recommended value vr for the welding speed, the recommended value Ir for the welding current, and the recommended value Vr for the welding voltage based on the object-to-be-welded information, the welding method information, and the quantity of arc heat Q. The feed speed calculation step S5, if at least one of the leg length S and the welding speed v which are displayed as welding conditions after the fourth step S4 is changed to a value different from the recommended values determined in the fourth step, calculates the wire feed speed WF from the after-change value, based on the formula for calculating the wire feed speed, which is in proportion to the square of the leg length S and also in proportion to the welding speed v. The current value calculation step S6 calculates the welding current I from the wire feed speed WF1 calculated in the feed speed calculation step S5 based either on a formula for calculating the welding current I, which increases with an increase in the wire feed speed WF, or on a table showing the relation between the wire feed speed WF and the welding current I. The voltage value calculation step S7 calculates the welding voltage V from the welding current I calculated in the current value calculation step S6. The welding current I calculated in the current value calculation step S6 and the welding voltage V calculated in the voltage value calculation step S7 are determined to be a new recommended value for the welding current I and a new recommended value for the welding voltage V, respectively.

This method can determine and display the recommended values for the welding conditions which are suitable for the information about the object to be welded and the information about the welding method set by the operator. The welding conditions include the welding current I, the welding voltage V, the wire feed speed WF, the welding speed v, and the leg length S. Furthermore, if the operator changes the recommended value for a welding condition to a new value, the method can determine new recommended values for the other welding conditions compatible with the new value and display the new recommended values.

This reduces the operator's time and effort to determine the welding conditions, thereby reducing the operator's burden to set welding conditions. This also reduces the amount of objects wasted until the definitive welding conditions are determined.

In the method to determine welding conditions according to the present invention, the feed speed calculation step S5 calculates the wire feed speed WF1 if the leg length S displayed as a welding condition after the fourth step S4 is changed to a value different from the recommended value for the leg length determined in the fourth step S4. The wire feed speed WF1 is calculated from the after-change value S1 of the leg length and the recommended value vr for the welding speed based on the formula for calculating the wire feed speed. The voltage value calculation step S6 calculates the welding voltage V from the welding current I calculated in the current value calculation step S6 based either on a formula for calculating the welding voltage V, which increases with an increase in the welding current I, or on a table showing the relation between the welding current I and the welding voltage V. If the displayed leg length S is changed, the welding current I1 calculated in the current value calculation step S6 and the welding voltage V1 calculated in the voltage value calculation step S7 are determined to be the new recommended value for the welding current I and the new recommended value for the welding voltage V, respectively.

The method to determine welding conditions according to the present invention may further include a quantity of heat determination step S8 of determining the quantity of arc heat Q from the welding current I1 calculated in the current value calculation step S6, the welding voltage V1 calculated in the voltage value calculation step S7, and the recommended value vr for the welding speed. Only when the quantity of arc heat Q1 determined in the quantity of heat determination step S8 is within the acceptable range, the welding current I1 calculated in the current value calculation step S6 and the welding voltage V1 calculated in the voltage value calculation step S7 are determined to be the new recommended value for the welding current I and the new recommended value for the welding voltage V, respectively.

This method can determine the recommended values for the welding current I and the welding voltage V to generate an appropriate quantity of arc heat Q.

Second Exemplary Embodiment

Figure 8:
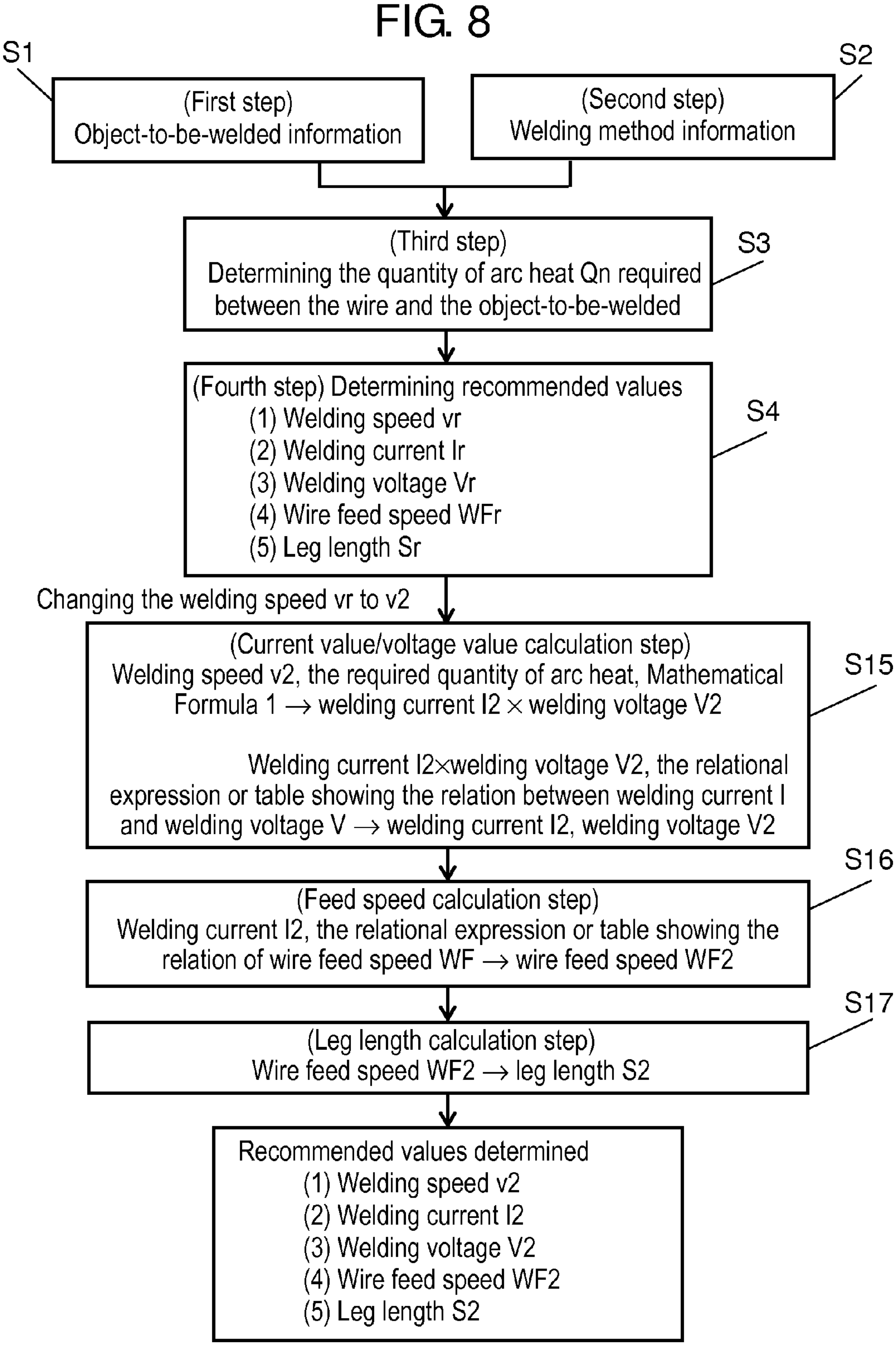
FIG. 8 is a flowchart showing a procedure to determine recommended values for welding conditions in a second exemplary embodiment of the present invention.

FIG. 8 is a flowchart showing a procedure to determine recommended values for welding conditions in a second exemplary embodiment of the present invention.

The welding device and the method to determine welding conditions according to the present second exemplary embodiment will be described mainly with reference to FIG. 8. The same components as in the first exemplary embodiment are denoted by the same reference numerals, and hence the description thereof will be omitted. The present second exemplary embodiment differs from the first exemplary embodiment mainly in the processes after the recommended values for welding conditions are determined based on the object-to-be-welded information and the welding method information. In the first exemplary embodiment, the recommended value Sr is changed to a new value for the leg length, and then new recommended values for the other welding conditions are calculated. In the present second exemplary embodiment, on the other hand, the recommended value vr is changed to a new value for the welding speed, and then new recommended values for the other welding conditions are calculated.

The following is a description of a method to determine and displaying new recommended values for the welding current I, the welding voltage V, the wire feed speed WF, and the leg length S when the operator changes the displayed recommended value vr for the welding speed to a new value.

As shown in FIG. 8, based on the object-to-be-welded information and the welding method information, the following values are calculated: the recommended value vr for the welding speed, the recommended value Ir for the welding current, the recommended value Vr for the welding voltage, the recommended value WFr for the wire feed speed, and the recommended value Sr for the leg length. Since the processes up to the fourth step S4 are identical to those in FIG. 3, the description of the fourth step S4 is omitted and the subsequent processes will be described.

The welding speed v may be determined according to the task time balance, and therefore, may be changed to a value different from the recommended value vr. Therefore, setting device 5 of the welding device according to the present second exemplary embodiment includes welding speed setting unit 14, which allows the operator to change the value of the welding speed v by entering an arbitrary value.

The following is a description of a method to determine new recommended values for the welding current I and the other welding conditions assuming that the operator has changed the value of the welding speed v from the recommended value vr to v2 through welding speed setting unit 14 of setting device 5 when the recommended value vr is displayed on display unit 15 of setting device 5.

New recommended values for the welding current I and the welding voltage V are calculated as follows.

Even when the welding speed v is changed from the recommended value vr to the new welding speed v2, the object-to-be-welded information and the welding method information remain the same. Therefore, the board thickness T, which is the average value of the board thicknesses T1 and T2 of upper and lower boards 16 and 17 as object 6, remain the same. The relation between the board thickness T and the quantity of arc heat Qn shown in FIG. 4 also remains the same. As a result, the quantity of arc heat Qn, which indicates the quantity of heat of an arc created between wire 1 and object 6, has the same value as in the first exemplary embodiment.

Calculation unit 9 then calculates the product of a welding current I2×a welding voltage V2 in Mathematical Formula 1 from the quantity of arc heat Qn, the new value v2 of the welding speed, and Mathematical Formula 1.

The welding voltage V increases with an increase in the welding current I. Therefore, the relation between the welding current I and the welding voltage V is uniquely determined based on the welding method information. A plurality of pieces of information (mathematical formulas or tables) about the relation between the welding current I and the welding voltage V, which are associated with the welding method information are previously stored in storage unit 10. Calculation unit 9 specifies one piece of information about the relation between the welding current I and the welding voltage V based on the entered welding method information. Calculation unit 9 then calculates the welding current I2 and the welding voltage V2 based on the specified piece of information. Thus, one point is determined on the properties indicating the relation between the welding current I2 and the welding voltage V2 because the product of the welding current I2×the welding voltage V2 is determined. The welding current I and the welding voltage V on this point become the welding current I2 and the welding voltage V2, respectively. This process is performed in a current value/voltage value calculation step S15 shown in FIG. 8.

A new recommended value for the wire feed speed WF is calculated as follows.

The welding current I increases with an increase in the wire feed speed WF. Therefore, the relation between the wire feed speed WF and the welding current I is uniquely determined based on the welding method information. A plurality of pieces of information (mathematical formulas or tables) about the relation between the wire feed speed WF and the welding current I, which are associated with the welding method information are previously stored in storage unit 10.

Calculation unit 9 calculates a wire feed speed WF2 based on the information about the relation between the wire feed speed WF and the welding current I stored in storage unit 10, the welding method information entered in the second step S2, and the welding current I2, which is calculated above as the new recommended value. The wire feed speed WF2 is determined to be the new recommended value. This process is performed in a feed speed calculation step S16 shown in FIG. 8.

A new recommended value S2 for the leg length S is calculated as follows.

As described in the first exemplary embodiment, the leg length S, the wire diameter d, the wire feed speed WF, and the welding speed v are in the relation shown in Mathematical Formula 2, which is stored in storage unit 10.

Calculation unit 9 then calculates the recommended value S2 for the leg length S from Mathematical Formula 2 stored in storage unit 10, the wire diameter d entered in the second step S2, the above-calculated wire feed speed WF2 (recommended value), and the welding speed v2 which has replaced the recommended value vr. This process is performed in a leg length calculation/acquisition step S17 shown in FIG. 8.

Thus, when the welding speed v is changed from the recommended value vr to a different value, the recommended values for the other welding conditions can be calculated as described above. Then, the wire feed speed WF2, the welding current I2, the welding voltage V2, and leg length S2 calculated in the calculation unit 9 are displayed as the new recommended values on display unit 15 of setting device 5.

As described above, the method to determine welding conditions includes the current value/voltage value calculation step S15 of calculating a welding current and a welding voltage after the fourth step S4.

When the welding speed v displayed as a welding condition is changed to the value v2 different from the recommended value vr, the current value/voltage value calculation step S15 calculates the welding current I2 and the welding voltage V2 from an integrated value I2×V2 of the welding current and the welding voltage based on a relational expression or table showing the relation between welding current and welding voltage. The integrated value is calculated from the already-determined quantity of arc heat Qn and the displayed after-change value of the welding speed based on the formula for calculating the quantity of arc heat. The formula is used to calculate the quantity of arc heat, which is in proportion to the welding current and the welding voltage and is in inverse proportion to the welding speed.

Thus, when the displayed welding speed vr is changed, the welding current I2 and the welding voltage V2 calculated in the current value/voltage value calculation step S15 are determined to be the new recommended value for the welding current I and the new recommended value for the welding voltage V, respectively.

This method can determine and display the recommended values for the welding conditions which are suitable for the information about the object to be welded and the information about the welding method set by the operator. The welding conditions include a welding current, a welding voltage, a wire feed speed, a welding speed, and a leg length. Furthermore, if the operator changes the recommended value for a welding condition to a new value, the method can determine new recommended values for the other welding conditions compatible with the after-change value and display the new recommended values.

The method to determine welding conditions includes the feed speed calculation step S16, and the leg length calculation step S17 after the current value/voltage value acquisition step S15. The feed speed calculation step S16 calculates the wire feed speed WF2 from the welding current I2 calculated in the current value/voltage value calculation step S15 based on the relational expression or table between the welding current and the wire feed speed. The leg length calculation step S17 calculates the leg length S2 from the wire feed speed WF2 calculated in the feed speed calculation step S16.

Alternatively, the recommended values for welding conditions can be calculated by another approach as described below.

Figure 9:
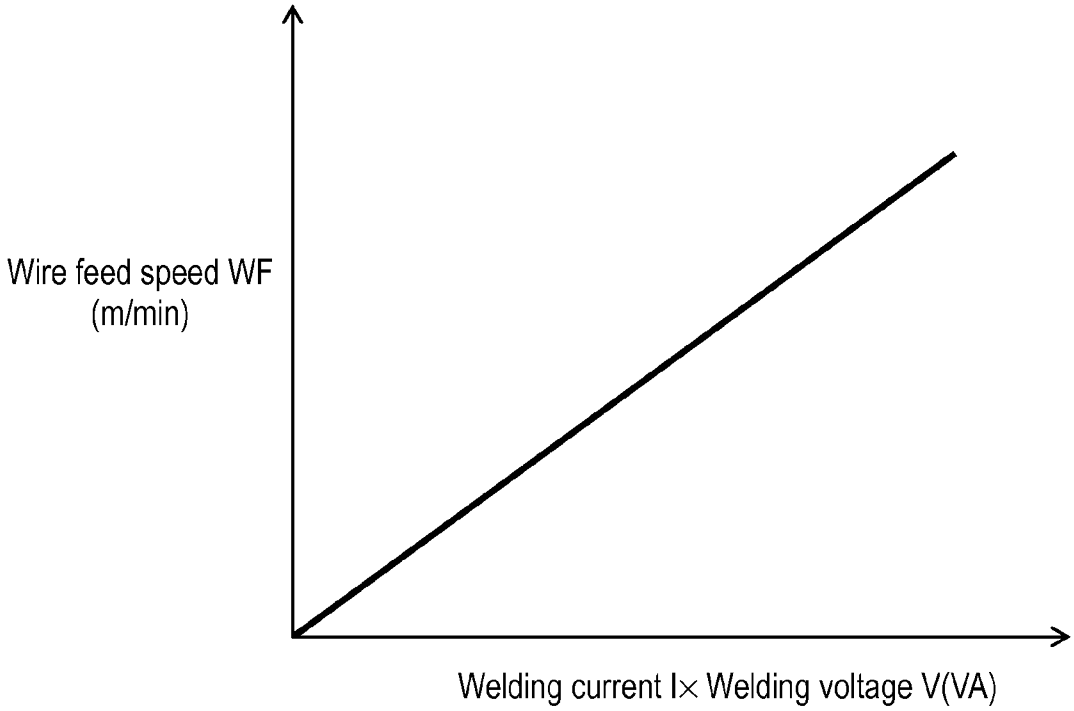
FIG. 9 shows the relation between the product of welding current I×welding voltage V and wire feed speed WF in the second exemplary embodiment.
Figure 10:
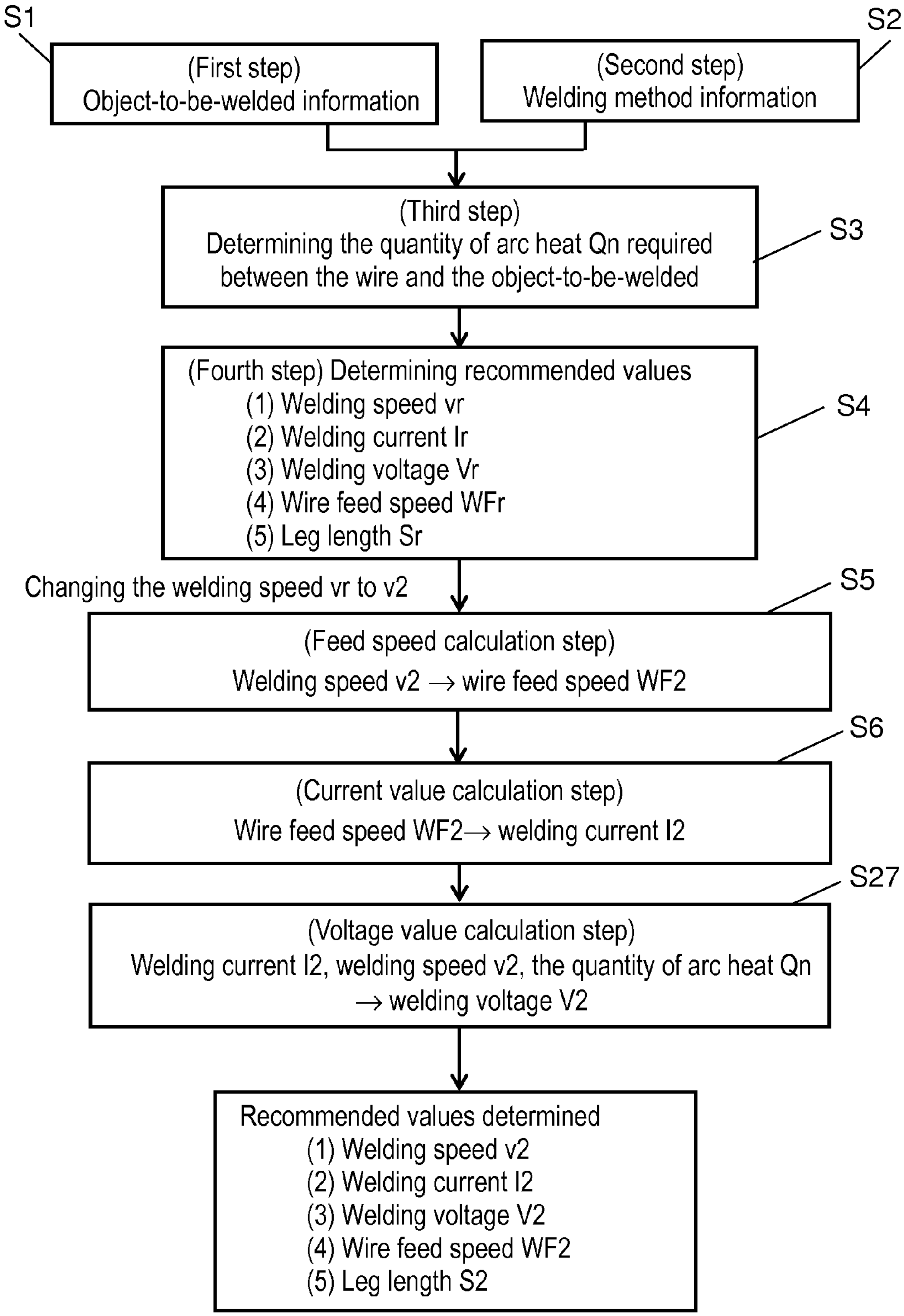
FIG. 10 is a flowchart showing another procedure to determine the recommended values for the welding conditions in the second exemplary embodiment.
Figure 11:
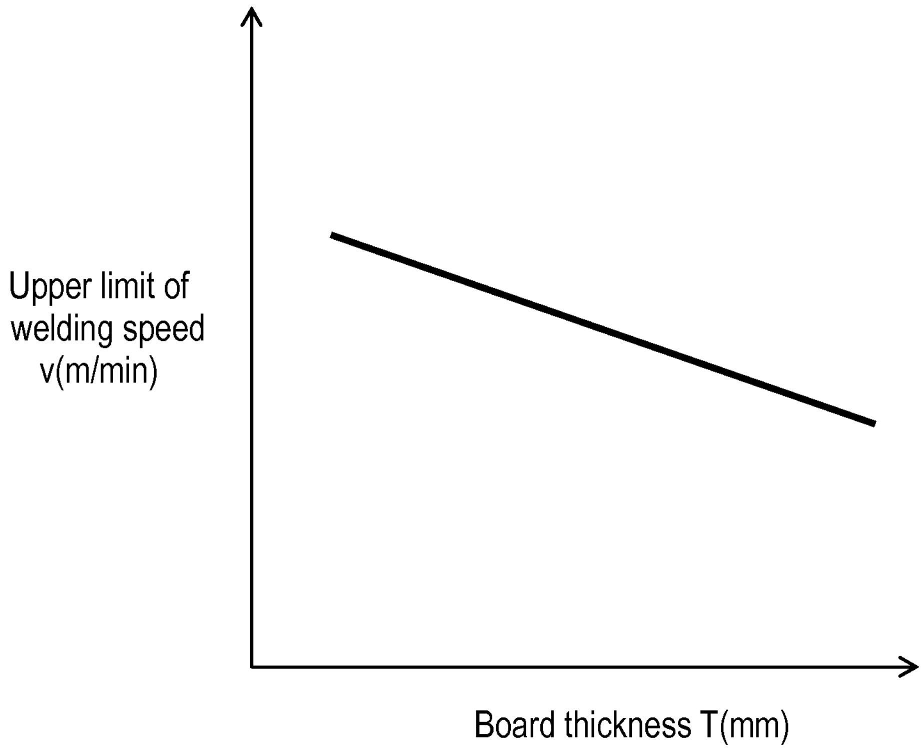
FIG. 11 shows the relation between board thickness and welding speed in the second exemplary embodiment.

FIG. 9 shows the relation between the product of the welding current I×the welding voltage V and the wire feed speed WF in the second exemplary embodiment. FIG. 10 is a flowchart showing another procedure to determine the recommended values for the welding conditions in the second exemplary embodiment. FIG. 11 shows the relation between board thickness and welding speed in the second exemplary embodiment.

The inventors of the present invention have experimentally confirmed that as shown in FIG. 9, the relation between the welding current I×the welding voltage V, and the wire feed speed WF are in proportion to each other. Assume that the welding speed vr is increased α-fold to become a welding speed v3. In this case, according to Mathematical Formula 1, the product of the welding current I3×the welding voltage V3 is also required to be increased by a times the product of the welding current Ir×the welding voltage Vr in order to keep the quantity of arc heat Q constant.

As shown in FIG. 9, the wire feed speed WF and the product of the welding current I×the welding voltage V are in proportion to each other. Therefore, when the product of the welding current I×the welding voltage V is increased α-fold, the wire feed speed WF is also increased α-fold. In other words, when the welding speed vr is increased α-fold to become the welding speed v2, the wire feed speed WF2 is increased by a times the wire feed speed WFr. Thus, according to Mathematical Formula 2, even when the welding speed v is changed, the leg length S remains the same as long as the quantity of arc heat Q is kept constant. When the welding speed v is changed, the wire feed amount WF can be set to keep the leg length S constant, achieving appropriate welding with the same quantity of arc heat Q.

In the above-described example, when the recommended value vr for the welding speed is changed to the welding speed v2, the welding current I2 and the welding voltage V2 are obtained from calculation to keep the quantity of arc heat Q constant. Alternatively, the recommended values for the welding conditions may be determined by another procedure when the relation shown in FIG. 9 is satisfied. To be more specific, calculation unit 9 calculates the wire feed speed WF2 based on Mathematical Formula 3 so as to keep the leg length S constant. Calculation unit 9 then calculates the welding current I2 based on the relation (a calculation formula or table) indicating that the welding current I increases with an increase in the wire feed speed WF. Calculation unit 9 then calculates the welding voltage V2 based on the relation (a calculation formula or table) indicating that the welding voltage V2 increases with an increase in the welding current I2.

The above-described other method to determine welding conditions according to the present second exemplary embodiment will be described with reference to FIG. 10.

In the method to determine welding conditions according to the present second exemplary embodiment, when the recommended value vr is changed to the welding speed v2, the fourth step S4 is followed by the feed speed calculation step S5, the current value calculation step S6, and a voltage value calculation step S27. The welding current I2 calculated in the current value calculation step S6, and the welding voltage V2 calculated in the voltage value calculation step S27 are determined to be the new recommended value for the welding current I and the new recommended value for the welding voltage V, respectively.

To be more specific, the feed speed calculation step S5 calculates the wire feed speed WF2 if the welding speed v displayed after the fourth step is changed to a value different from the recommended value yr. The wire feed speed WF2 is calculated from the after-change value v2 of the welding speed and the recommended value Sr for the leg length based on the formula for calculating the wire feed speed.

The voltage value calculation step S27 calculates the welding voltage V2 from the quantity of arc heat Qn determined in the third step S3, the after-change value v2 of the welding speed, and the welding current I2 calculated in the current value calculation step S6 based on the formula for calculating the quantity of arc heat. The formula is used to calculate the quantity of arc heat which is in proportion to the welding current and the welding voltage and is in inverse proportion to the welding speed.

If the displayed welding speed vr is changed to the welding speed v2, the welding current I2 calculated in the current value calculation step S6 and the welding voltage V2 calculated in the voltage value calculation step S27 are determined to be the new recommended value for the welding current and the new recommended value for the welding voltage, respectively.

Thus, this method can determine and display the recommended values for welding conditions which are suitable for the information about the object to be welded and the information about welding method set by the operator. The welding conditions include the welding current I, the welding voltage V, the wire feed speed WF, the welding speed v, and the leg length S. Furthermore, if the operator changes the recommended value vr for the feed speed to a new value, the method can determine new recommended value for the other welding conditions compatible with the after-change value v2 of the welding speed and display the new recommended values.

There are different welding target positions and different welding torch angles depending on the object-to-be-welded information set in the first step S1. Therefore, the welding device can also combine the appropriate condition of the average board thickness (T) of upper and lower boards 16 and 17 and the appropriate condition of the difference between their thicknesses included in the object-to-be-welded information set in the first step S1.

As shown in FIG. 5, the torch angle and the target position are displayed on display unit 15 of setting device 5, thereby being provided as information to the operator. Note that the welding speed v is not uniquely determined with respect to the object-to-be-welded information set in the first step S1.

In reality, as shown in FIG. 11, the welding speed has an upper limit. The inventors of the present invention have experimentally confirmed that the upper limit of the welding speed tends to decrease with an increase in the board thickness T.

Therefore, the welding speed v2, which is different from the recommended value, may exceed the upper limit of the welding speed v stored in storage unit 10. In that case, the welding speed v2 set by the operator is determined to be outside the acceptable range.

Display unit 15 of setting device 5 displays that the welding speed v2 set by the operator is outside the acceptable range according to the determination result. Display unit 15 does not display the new recommended values for the welding current I2, the welding voltage V2, and the other conditions calculated as above. This can prevent the operator from setting the new recommended values as the welding conditions. Display unit 15 further displays a message to urge the operator to enter a different welding speed v2.

Assume, on the other hand, that the set welding speed v2 is within the acceptable range. In this case, display unit 15 displays the calculated values of the welding current I2, the welding voltage V2, and the other welding conditions as the new recommended values. This allows the operator to set the new recommended values as the welding conditions.

Third Exemplary Embodiment

Figure 12A:
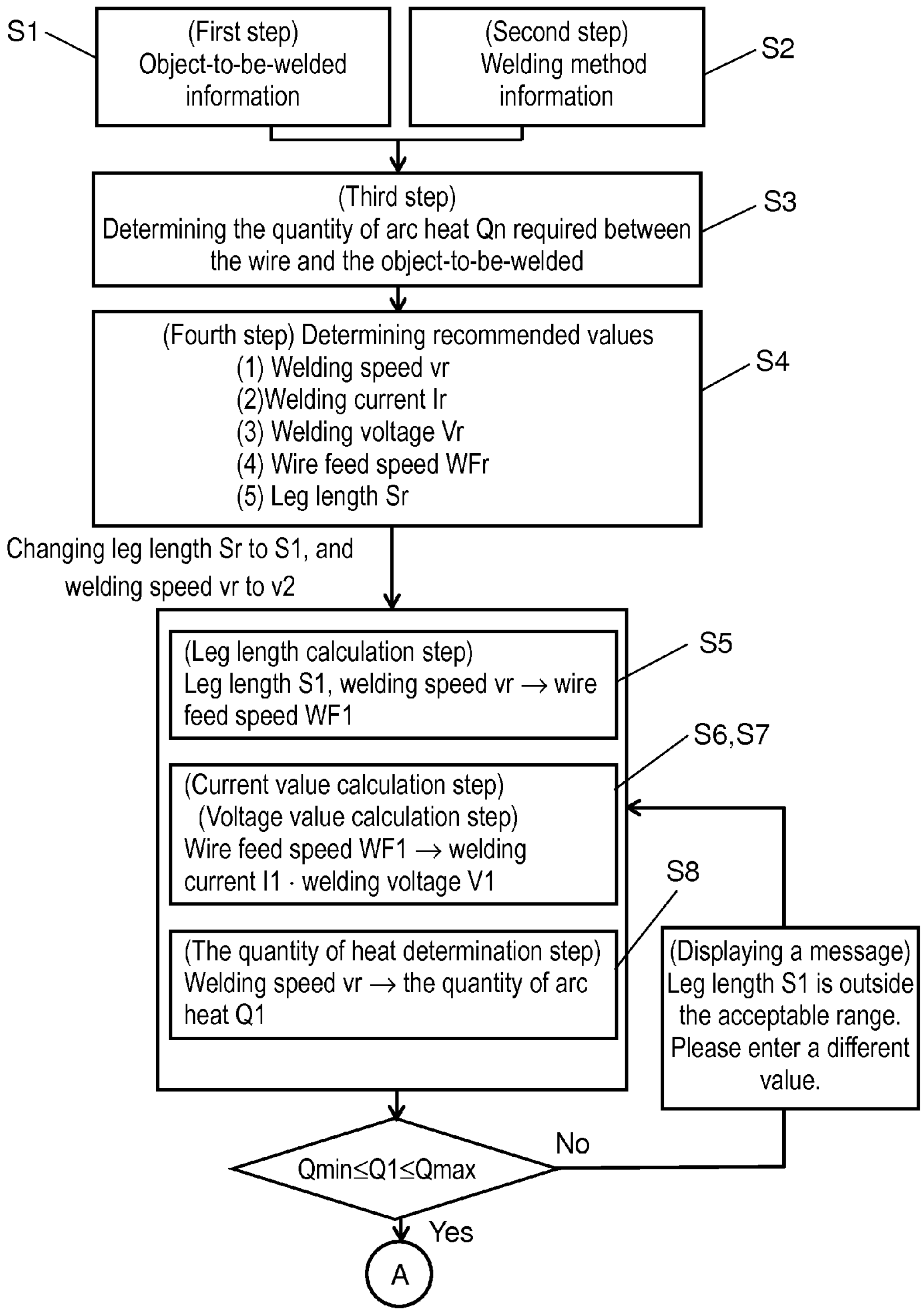
FIG. 12A is a first flowchart showing a procedure to determine recommended values for welding conditions in a third exemplary embodiment of the present invention.
Figure 12B:
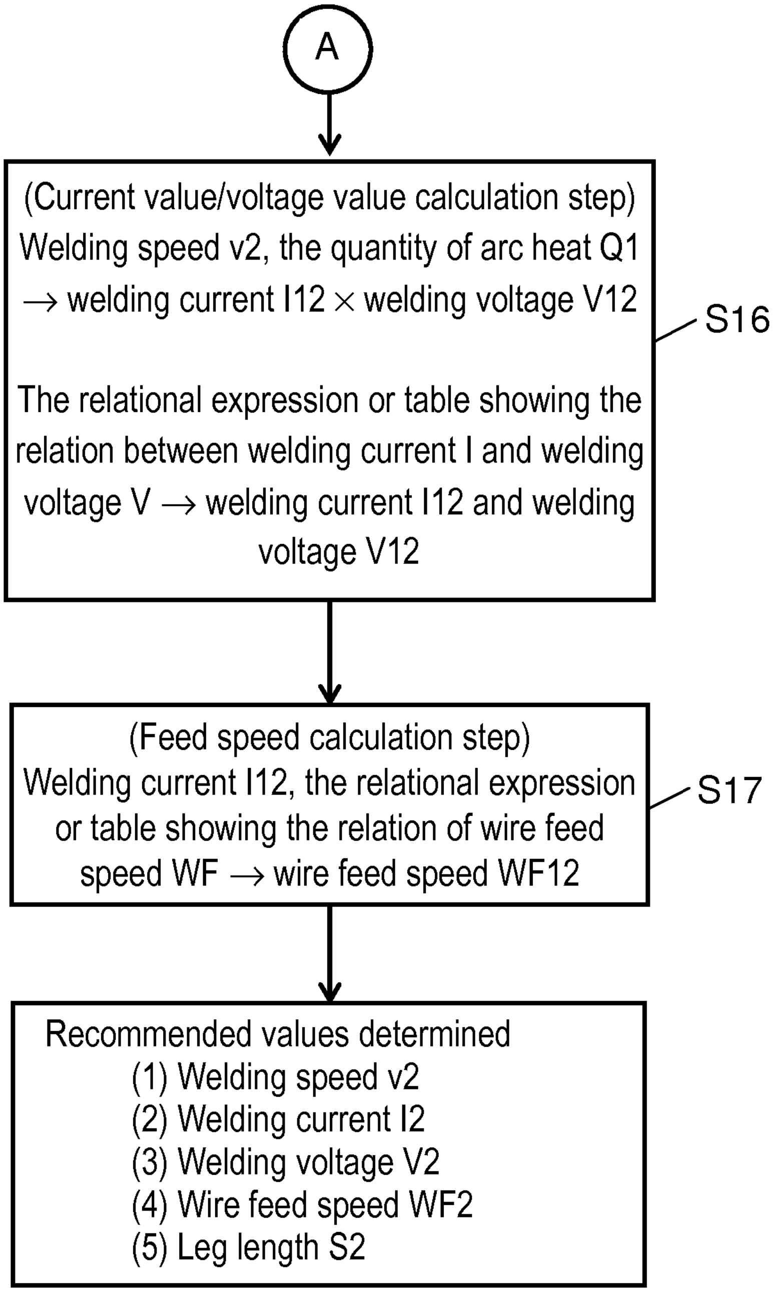
FIG. 12B is a second flowchart showing the procedure to determine the recommended values for the welding conditions in the third exemplary embodiment.

FIGS. 12A and 12B are first and second flowcharts, respectively, showing a procedure to determine recommended values for welding conditions in a third exemplary embodiment of the present invention.

The welding device and the method to determine welding conditions in the present exemplary embodiment will be described with reference to FIGS. 12A and 12B. The same components as in the first and second exemplary embodiments are denoted by the same reference numerals, and hence the description thereof will be omitted. The present exemplary embodiment differs from the first and second exemplary embodiments mainly in the processes after the recommended values for welding conditions are determined based on the object-to-be-welded information and the welding method information. In the first exemplary embodiment, the recommended value Sr is changed to a new value for the leg length, and then new recommended values for the other welding conditions are calculated. In the second exemplary embodiment, the recommended value vr is changed to a new value for the welding speed, and then new recommended values for the other welding conditions are calculated. In the present third exemplary embodiment, on the other hand, both the recommended value Sr for the leg length and the recommended value vr for the welding speed are changed to new values, and then new recommended values for the other welding conditions are calculated.

The operator may sometimes change the displayed recommended value Sr for the leg length and the displayed recommended value vr for the welding speed to the leg length S1 and the welding speed v2, respectively. In that case, the new recommended values for the welding current I, the welding voltage V, the wire feed speed WF are determined and displayed as follows.

When the recommended values of the leg length S and the welding speed v are both changed to new values, the leg length S, which is an item to determine the weld joint performance, is probably given priority over the welding speed v. For this reason, the following is based on the assumption that the welding conditions are calculated according to the change in the leg length S, and then according to the change in the welding speed v.

First, the calculations of the welding conditions according to the change in the recommended value Sr for the leg length are described as follows. Note that the calculations of the welding conditions according to the change in the recommended value Sr for the leg length (the feed speed calculation step S5, the current value calculation step S6, the voltage value calculation step S7, and the quantity of heat determination step S8) are not repeated here because they are the same as in the first exemplary embodiment. In these calculations, the welding speed v is not the new value v2 of the welding speed, but is the recommended value vr determined based on the object-to-be-welded information set in the first step S1 as in the first exemplary embodiment.

The welding device determines the recommended values for the other welding conditions to be the welding current I1, the recommended value for the welding voltage V1, and the wire feed speed WF1.

Similar to the first exemplary embodiment, the recommended values for the other welding conditions are calculated after the determination of whether or not the leg length S1 is within the acceptable range (the quantity of heat determination step S8).

Next, the calculations of the welding conditions according to the change in the recommended value vr for the welding speed are described as follows. Note that no description is given here about the calculations of welding conditions according to the change in the recommended value vr for the welding speed, or about the determination whether or not the welding speed v exceeds the upper limit because they are the same as in the second exemplary embodiment. Also note that the leg length S used in these calculations is the after-change value S1 of the leg length in the same manner as in the second exemplary embodiment.

The welding device determines the recommended values for the other welding conditions to be a welding current I12, a welding voltage V12, and a wire feed speed WF12.

Similar to the second exemplary embodiment, calculation unit 9 calculates the recommended values for the other welding conditions after determining whether or not the welding speed v2 is within the acceptable range.

As described above, when the leg length is changed from the recommended value Sr to the leg length S1, and the welding speed is changed from the recommended value vr to the welding speed v2, the welding device calculates the welding current I12, the welding voltage V12, and the wire feed speed WF12 as the recommended values for the other welding conditions, and displays them on display unit 15 of setting device 5. The leg length S1 and the welding speed v2, which have replaced the recommended value for the leg length S and the recommended value for the welding speed v, respectively, are displayed on display unit 15 of setting device 5.

Thus, the method to determine welding conditions includes, after the fourth step S4, the feed speed calculation step S5, the current value calculation step S6, the quantity of heat determination step S7, the quantity of heat calculation step S8, and the current value/voltage value calculation step S16.

When the leg length and the welding speed which are displayed as welding conditions are changed to values different from the recommended values determined in the fourth step S4, the welding current I12 and the welding voltage V12 calculated in the current value/voltage value calculation step S16 are determined to be the new recommended value of the welding current and the new recommended value for the welding voltage, respectively.

The feed speed calculation step S5 calculates the wire feed speed WF1 from the after-change value S1 of the leg length and the recommended value vr for the welding speed based on the formula for calculating the wire feed speed, which is in proportion to the square of the leg length and also in proportion to the welding speed.

The current value calculation step S6 calculates the welding current I1 from the wire feed speed WF1 calculated in the feed speed calculation step S5 based either on the formula for calculating the welding current which increases with an increase in the wire feed speed, or on the table showing the relation between the wire feed speed and the welding current.

The voltage value calculation step S7 calculates the welding voltage V1 from the welding current I1 calculated in the current value calculation step S6 based either on the formula for calculating the welding voltage which increases with an increase in the welding current, or on the table showing the relation between the welding current and the welding voltage.

The quantity of heat determination step S8 determines the quantity of arc heat Q1 from the welding current I1 calculated in the current value calculation step S6, the welding voltage V1 calculated in the voltage value calculation step S7, and the recommended value vr for the welding speed.

The current value/voltage value calculation step S16 calculates the integrated value of the welding current and the welding voltage from the quantity of arc heat Q1 determined in the quantity of heat determination step S8 and the after-change value v2 of the welding speed based on the formula for calculating the quantity of arc heat. The current value/voltage value calculation step S16 then calculates the new recommended values for the welding current I and the welding voltage V from the integrated value based on the relational expression or table showing the relation between the welding current and the welding voltage.

Thus, the welding current I12 and the welding voltage V12 calculated in the current value/voltage value calculation step S16 are determined to be the new recommended value for the welding current and the new recommended value for the welding voltage, respectively.

The welding device and the method to determine welding conditions according to the present third exemplary embodiment can determine the recommended values for the welding conditions which are suitable for the information about the object to be welded and the information about the welding method set by the operator, and can display the recommended values on display unit 15. The welding conditions include the welding current Ir, the welding voltage Vr, the wire feed speed WFr, the welding speed vr, and the leg length Sr. Furthermore, if the operator changes the recommended value Sr for the leg length and the recommended value vr for the welding speed to new values, the welding device and the method can determine new recommended values for the other welding conditions compatible with the new values and display the new recommended values. This greatly reduces the operator's time and effort to determine the welding conditions, and the amount of objects wasted through trial and error.

Alternatively, the recommended values for welding conditions can be calculated by another approach as described below.

Figure 13A:
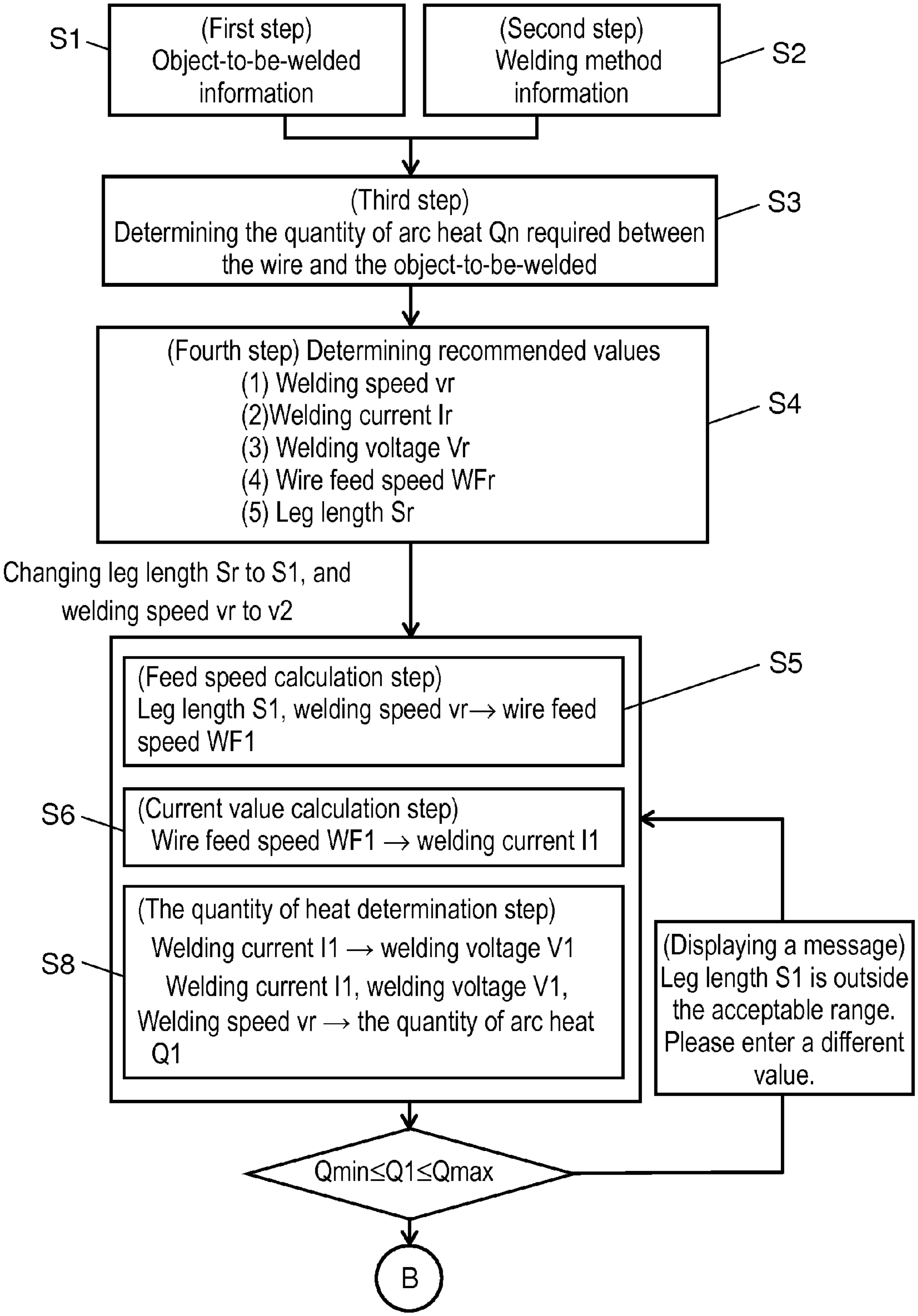
FIG. 13A is a first flowchart showing a procedure to determine other recommended values for the welding conditions in the third exemplary embodiment.
Figure 13B:
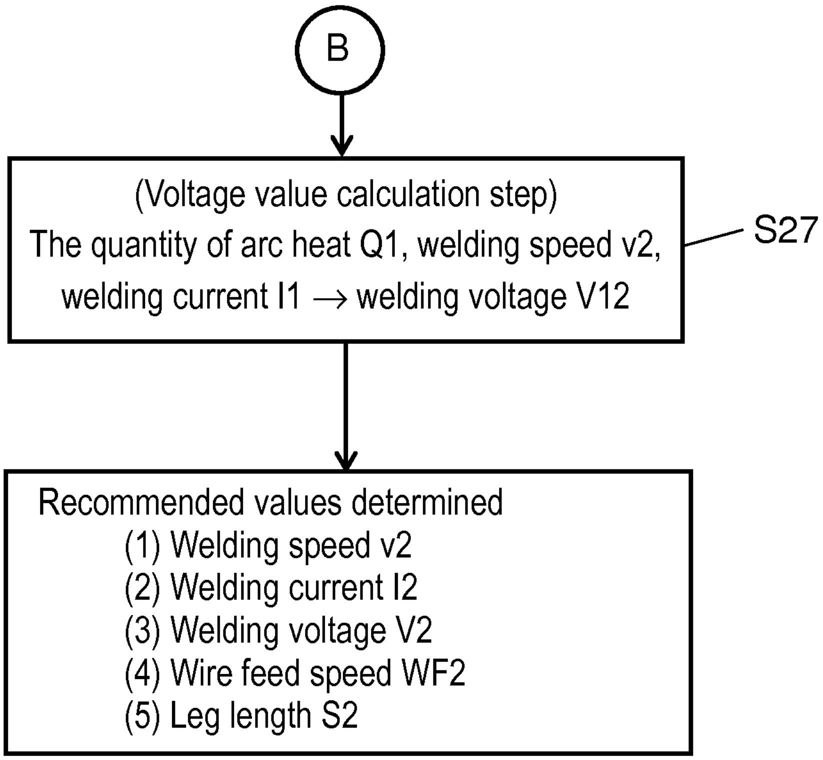
FIG. 13B is a second flowchart showing a procedure to determine the other recommended values for the welding conditions in the third exemplary embodiment.

FIGS. 13A and 13B are first and second flowcharts, respectively showing a procedure to determine other recommended values for the welding conditions in the third exemplary embodiment.

Thus, the method to determine welding conditions includes, after the fourth step S4, the feed speed calculation step S5, the current value calculation step S6, the quantity of heat determination step S8, and the voltage value calculation step S27.

The feed speed calculation step S5 calculates the wire feed speed WF1 if the leg length and the welding speed displayed after the fourth step S4 are both changed to values different from the recommended values. The wire feed speed WF1 is calculated from the after-change value S1 of the leg length and the recommended value vr for the welding speed based on the formula for calculating the wire feed speed.

The current value calculation step S6 calculates the welding current I1 from the wire feed speed WF1 calculated in the feed speed calculation step S5 based either on the formula for calculating the welding current which increases with an increase in the wire feed speed, or on the table showing the relation between the wire feed speed and the welding current.

The quantity of heat determination step S8 determines the quantity of arc heat Q1 from the welding current I1 calculated in the current value calculation step S6, the welding voltage V1 calculated from the welding current I1 based either on the formula for calculating the welding voltage or on the table showing the relation between the welding current and the welding voltage, and the recommended value vr for the welding speed. The formula is used to calculate the welding voltage which increases with an increase in the welding current.

The voltage value calculation step S27 calculates the welding voltage V12 from the quantity of arc heat Q1 determined in the quantity of heat determination step S8, the after-change value v2 of the welding speed, and the welding current I1 calculated in the current value calculation step S6 based on the formula for calculating the quantity of arc heat. The formula is used to calculate the quantity of arc heat, which is in proportion to the welding current and the welding voltage and is in inverse proportion to the welding speed.

When the displayed leg length and the displayed welding speed are changed, the welding current I1 calculated in the current value calculation step S6, and the welding voltage V12 calculated in the voltage value calculation step S27 are determined to be the new recommended value for the welding current and the new recommended value for the welding voltage, respectively.

In the first through third exemplary embodiments, the operator enters the object-to-be-welded information which is the information about object 6 to the welding device in the first step S1. The object-to-be-welded information includes the material of object 6, the board thicknesses of upper and lower boards 16 and 17 of object 6, the board thickness T indicating the average board thickness of upper and lower boards 16 and 17, and the joint shape of object 6. At least one item of the information can be used as the object-to-be-welded information.

The joint shape can be T joint, lap joint, butt joint, corner joint, edge joint, flare groove joint, etc.

In the first through third exemplary embodiments, the operator enters welding method information, which is the information about the arc welding method to the welding device in the second step S2. The welding method information includes the following items: the use or non-use of pulse welding in the arc welding, the pulse mode type, the shielding gas type, the extended length of the welding wire, the method for controlling the wire feed, the wire material, and the wire diameter. At least one item of the welding method information can be used.

The use or non-use of pulse welding means whether or not pulse welding is used in the arc welding. The pulse mode type is selected from a plurality of pulse mode types. The shielding gas type is selected from shielding gases used for welding such as $CO_2$ gas, 80% Ar-20% $CO_2$ gas, or 98% Ar-2% $O_2$ gas. The extended length of the welding wire means the distance between the chip and the base material, and is individually set, for example, to 15 mm or 20 mm. The method for controlling the wire feed means the setting mode of wire feed, such as continuous forward feeding or alternation of forward feeding and backward feeding. The wire material means the material of the welding wire, such as soft steel or stainless. The wire diameter means the diameter of the welding wire, such as $\phi$ 0.9 mm or $\phi$ 1.0 mm.

In the first through third exemplary embodiments, the recommended values for the welding speed v, the welding current I, the welding voltage V, the wire feed speed WF, and the leg length S are calculated and displayed as the welding conditions based on the object-to-be-welded information and the welding method information.

In the first exemplary embodiment, when the value of the leg length S is changed, new recommended values for the welding speed v, the welding current I, the welding voltage V, and the wire feed speed WF are calculated and displayed as the other welding conditions.

In the second exemplary embodiment, when the value of the welding speed v is changed, new recommended values for the welding current I, the welding voltage V, the wire feed speed WF, and the leg length S are calculated and displayed as the other welding conditions.

In the third exemplary embodiment, when the value of the leg length S and the value of the welding speed v are changed, new recommended values for the welding current I, the welding voltage V, and the wire feed speed WF are calculated and displayed as the other welding conditions.

The operational program stored in storage unit 10 may have an item corresponding to the welding condition such as the welding current or the welding voltage whose value has been calculated as a recommended value or changed to a new value. In that case, control unit 8 changes the value of the item in the operational program to the calculated or newly set value so that welding can be performed with appropriate welding conditions.

INDUSTRIAL APPLICABILITY

The method to determine welding conditions and the welding device according to the present invention, which can easily determine welding conditions, are industrially useful for various objects to be welded.

REFERENCE MARKS IN THE DRAWINGS

1 wire
2 welding torch
3 manipulator
4 robot controller
5 setting device
6 object to-be-welded
7 welding power supply
8 control unit
9 calculation unit
10 storage unit
11 object-to-be-welded information input unit
12 welding method information input unit
13 leg length setting unit
14 welding speed setting unit
15 display unit
16 upper board
17 lower board

The invention claimed is:

1. A welding device to determine welding conditions comprising:

an object-to-be-welded information input unit to receive object-to-be-welded information, which is information about an object to be welded;

a welding method information input unit to receive welding method information, which is information about an arc welding method;

a calculation unit to calculate a quantity of arc heat as a necessary quantity of arc heat based on the object-to-be-welded information and the welding method information, and to calculate a wire feed speed as a recommended wire feed speed, a leg length as a recommended leg length, a welding speed as a recommended welding speed, a welding current as a recommended welding current, and a welding voltage as a recommended welding voltage based on the necessary quantity of arc heat, the object-to-be-welded information and the welding method information;

a display unit to display calculation results of the calculation unit; and a leg length setting unit to change the leg length from the recommended leg length to a determined leg length;

wherein, when the leg length is changed from the recommended leg length to the determined leg length, the calculation unit recalculates the wire feed speed from the recommended wire feed speed to a determined wire feed speed, the welding current from the recommended welding current to a determined welding current and the welding voltage from the recommended welding voltage to a determined welding voltage, which are based on the determined leg length, and the display unit displays the recalculation results of the calculation unit.

2. The welding device of claim 1, wherein the wire feed speed is in proportion to a square of the leg length and in proportion to the welding speed.

3. The welding device of claim 1, wherein the calculation unit recalculates the determined wire feed speed prior to the determined welding current, and the calculation unit recalculates the determined welding current based on a formula which increases with an increase in the wire feed speed or based on a table showing a relation between the wire feed speed and the welding current.

4. The welding device of claim 1, wherein the calculation unit recalculates the determined welding current prior to the determined welding voltage, and the calculation unit recalculates the determined welding voltage based on the determined welding current.

5. The welding device of claim 4, wherein the calculation unit recalculates the determined welding voltage based on a formula which increases with an increase in the welding current or based on a table showing a relation between the welding current and the welding voltage.

6. The welding device of claim 1, wherein the calculation unit recalculates the quantity of arc heat as a determined quantity of arc heat based on the determined welding current, the determined welding voltage and the determined welding speed; and the calculation unit judges whether the determined quantity of arc heat is within an acceptable range.

7. A welding device comprising:

an object-to-be-welded information input unit to receive object-to-be-welded information, which is information about an object to be welded;

a welding method information input unit to receive welding method information, which is information about an arc welding method;

a calculation unit to calculate a quantity of arc heat as a necessary quantity of arc heat based on the object-to-be-welded information and the welding method information, and to calculate a wire feed speed as a recommended wire feed speed, a leg length as a recommended leg length, a welding speed as a recommended welding speed, a welding current as a recommended welding current, and a welding voltage as a recommended welding voltage based on the necessary quantity of arc heat, the object-to-be-welded information and the welding method information;

a display unit to display calculation results of the calculation unit; and a welding speed setting unit to change the welding speed from the recommended welding speed to a determined welding speed;

wherein, when the welding speed is changed from the recommended welding speed to the determined welding speed, the calculation unit recalculates the wire feed speed from the recommended wire feed speed to a determined wire feed speed, the welding current from the recommended welding current to a determined welding current and the welding voltage from the recommended welding voltage to a determined welding voltage, which are based on the determined welding speed, the calculation unit recalculates the leg length from the recommended leg length to a determined leg length based on the determined wire feed speed, and the display unit displays the recalculation results of the calculation unit.

8. The welding device of claim 7, wherein the wire feed speed is in proportion to a square of the leg length and in proportion to the welding speed.

9. The welding device of claim 7, wherein the calculation unit recalculates the determined wire feed speed prior to the determined welding current, and the calculation unit recalculates the determined welding current based on a formula which increases with an increase in the wire feed speed or based on a table showing a relation between the wire feed speed and the welding current.

10. The welding device of claim 7, wherein the calculation unit recalculates the determined welding current prior to the determined welding voltage, and the calculation unit recalculates the determined welding voltage based on the determined welding current.

11. The welding device of claim 10, wherein the calculation unit recalculates the determined welding voltage based on the necessary quantity of arc heat, the determined welding speed and the determined welding current, and wherein the quantity of arc heat is in proportion to the welding current and the welding voltage and is inverse proportion to the welding speed.

12. The welding device of claim 7, wherein a product of the determined welding voltage and the determined welding current is the same as the product of the recommended welding current and the recommended welding voltage, and the calculation unit recalculates the determined welding current and the determined welding voltage based on a rational expression or a table showing a relation between the welding current and the welding voltage.

13. The welding device of claim 12, wherein the calculation unit recalculates the determined welding current and the determined welding voltage prior to the determined wire feed speed, and the calculation unit recalculates the determined wire feed speed based on a rational expression or a table showing a relation between the welding current and the wire feed speed.

14. A welding device to determine welding conditions comprising:

an object-to-be-welded information input unit to receive object-to-be-welded information, which is information about an object to be welded;

a welding method information input unit to receive welding method information, which is information about an arc welding method;

a calculation unit to calculate a quantity of arc heat as a necessary quantity of arc heat based on the object-to-be-welded information and the welding method information, and to calculate a wire feed speed as a first recommended wire feed speed, a leg length as a recommended leg length, a welding speed as a recommended welding speed, a welding current as a first recommended welding current, and a welding voltage as a first recommended welding voltage based on the necessary quantity of arc heat, the object-to-be-welded information and the welding method information;

a display unit to display calculation results of the calculation unit;

a leg length setting unit to change the leg length from the recommended leg length to a determined leg length; and a welding speed setting unit to change the welding speed from the recommended welding speed to a determined welding speed;

wherein, when the leg length is changed from the recommended leg length to the determined leg length, the calculation unit recalculates the wire feed speed from the first recommended wire feed speed to a second recommended wire feed speed, the welding current from the first recommended welding current to a second recommended welding current and the welding voltage from the first recommended welding voltage to a second recommended welding voltage, which are based on the determined leg length, when the welding speed is changed from the recommended welding speed to the determined welding speed, the calculation unit recalculates the wire feed speed from the second recommended wire feed speed to a determined wire feed speed, the welding current from the second recommended welding current to a determined welding current and the welding voltage from the second recommended welding voltage to a determined welding voltage, which are based on the determined leg length and the determined welding speed, and the display unit displays the recalculation results of the calculation unit.

15. The welding device of claim 14, wherein the wire feed speed is in proportion to a square of the leg length and in proportion to the welding speed.

16. The welding device of claim 14, wherein the calculation unit recalculates the second recommended wire feed speed prior to the second recommended welding current, and the calculation unit recalculates the second recommended welding current based on a formula which increases with an increase in the wire feed speed or based on a table showing a relation between the wire feed speed and the welding current.

17. The welding device of claim 14, wherein the calculation unit recalculates the second recommended welding current prior to the second recommended welding voltage, and the calculation unit recalculates the second recommended welding voltage based on the second recommended welding current.

18. The welding device of claim 14, wherein the calculation unit recalculates the quantity of arc heat as a determined quantity of arc heat based on the second recommended welding current, the second recommended welding voltage and the recommended welding speed, the calculation unit recalculates the determined welding voltage based on the determined quantity of arc heat, the determined welding speed and the second recommended welding current, the quantity of arc heat is in proportion to the welding current and the welding voltage and is inverse proportion to the welding speed, the second recommended wire feed speed is not changed and is determined as the determined wire feed speed, and the second recommended welding current is not changed and is determined as the determined welding current.

19. The welding device of claim 18, wherein a product of the second recommended welding voltage and the second recommended welding current is the same as the product of the first recommended welding current and the first recommended welding, and the second recommended welding current and the second recommended welding voltage are based on a rational expression or a table showing a relation between the welding current and the welding voltage.

* * * * *